United States Patent [19]
Closson et al.

[11] 3,916,019
[45] Oct. 28, 1975

[54] OLEFIN DIMERIZATION

[75] Inventors: Rex D. Closson, Northville; John P. Napolitano; John C. Wollensak, both of Royal Oak, all of Mich.

[73] Assignee: Ethyl Corporation, Richmond, Va.

[22] Filed: July 13, 1967

[21] Appl. No.: 653,272

Related U.S. Application Data

[63] Continuation of Ser. No. 146,328, Oct. 19, 1961, abandoned.

[52] U.S. Cl. .................. 260/683.15 E; 252/443
[51] Int. Cl.² .......................................... C07C 3/20
[58] Field of Search ............ 260/683.15 E; 252/443

[56]          References Cited
              UNITED STATES PATENTS 3,207,812   9/1965   Hambling et al. .......... 260/683.15 E
3,291,752   12/1966   Hambling et al. ......... 260/683.15 X

*Primary Examiner*—Paul M. Coughlan, Jr.
*Attorney, Agent, or Firm*—Donald L. Johnson; John F. Sieberth; David L. Ray

[57]              ABSTRACT

A process for dimerizing straight chain alpha-olefins having 3 to 8 carbon atoms using as a catalyst sodium metal dispersed upon the carbonate of an alkali metal having an atomic number of 19 to 55, inclusive, or of the metal barium. Dimerizations of propylene at about 1000 psi in the presence of a catalyst consisting of sodium dispersed on potassium carbonate give good yields of 4-methylpentene-1.

2 Claims, No Drawings

OLEFIN DIMERIZATION

This application is a continuation of my prior application Ser. No. 146,328, filed Oct. 19, 1961, now abandoned.

The present invention is concerned with the dimerization of olefins, especially the dimerization of propylene to produce 4-methylpentene-1.

Many techniques have been employed for dimerizing or polymerizing olefinic materials to produce different, longer chain olefins. Certain of the alkali metals have been particularly effective as catalysts for such dimerization reactions at various conditions of temperature and pressure. The alkali metal catalyzed procedures have been especially described with regard to the dimerization of propylene to produce 4-methylpentene-1, a product which is quite useful in enhancing the octane properties of a hydrocarbon fuel or for polymerization to result in a polymer useful in fibers. By way of particular example, U.S. Pat. No. 2,986,588 (see also Belgian Pat. No. 588,134) describes the dimerization of propylene employing potassium as a catalyst. As indicated therein, the dimerization does occur for producing hexene products, especially 4-methylpentene-1, as a major component. Inherent in this technique, however, is the fact that the reaction rate is slow and still a considerable amount of isomerization occurs to produce other less desirable isomers. Further, the conversions and catalyst utilization leave something to be desired. Other technqiues which have been described include the use of polynuclear aromatic compounds as promoters for the alkali metal catalysts in the dimerization of olefins (note Freed U.S. Pat. No. 2,492,693) or the use of special supports for the alkali metal such as carbon (U.S. Pat. No. 2,881,234) and the use of aminated alkali metal on supports such as alumina (note Union of South Africa Pat. No. 60/4511). These procedures likewise suffer inherent disadvantages most notable of which, for example, is that in the case of propylene dimerization, little or no 4-methylpentene-1, the highly desired olefin, is obtained in the $C_6$ fraction.

A most particular disadvantage of the use of the prior art procedures for dimerizing olefins, especially propylene, is that no satisfactory techniques have been described wherein sodium metal is the alkali metal employed. Indeed, in most systems, no reaction is even obtained to produce dimerized product. Still further, sodium is known to result in undesirable isomerization even in those instances where some, though slight, dimerization of an olefin has been demonstrated. Thus, it is quite desirable to the industry to provide a process for the dimerization of olefins, especially propylene, based upon sodium metal, the most economical alkali metal available.

Accordingly, an object of this invention is to provide a new and novel process for the dimerization of olefins. A particular object is to provide a process whereby olefins are dimerized at a faster rate more selectively and at greater conversions with a minimization of isomerization of the resulting product to a less desirable olefin. Still further objects are to overcome the above and other deficiencies of the prior art procedures of alkali metal dimerization. A specific object is to provide a more effective, selective, and improved method for dimerizing propylene than known heretofore. Other objects will be evident as the discussion proceeds.

The above and other objects of this invention are accomplished by heating an olefin in the presence of a catalyst comprising sodium metal and a carbonate of a metal selected from the group consisting of alkali metals having an atomic number of 19 to 55, inclusive, and barium. The olefins are generally straight chain having from 3 up to and including about 8 carbon atoms with propylene being especially preferred. Of the carbonates, potassium carbonate is particularly preferred. It has been found that the carbonates activate and promote the dimerization reaction with sodium as the alkali metal and, indeed, results in a more selective reaction, e.g. in the case of propylene to 4-methylpentene-1. The temperature which is employed is preferably of the order of 150° to 200°C with pressures being between 300 and 1500 psi. Likewise, the concentration of the carbonate promoter employed may vary from 10 to 99.5 percent by weight of the total of the sodium and the carbonate employed as the catalyst system. By way of example of a preferred embodiment, propylene is heated in the presence of and in contact with a minor amount of about 2.5 percent by weight, based on the total weight of propylene and catalyst, of a catalyst mixture of sodium and potassium carbonate in a ratio of 5 parts of the former to 1 part by weight of the latter at 150° to 200°C and 300 to 1500 psi to produce 4-methylpentene-1.

The process of the present invention has many unique advantages over the prior art procedures for dimerizing or polymerizing olefins. Foremost among these advantages is the fact that for the first time a procedure is provided for an efficient and effective dimerization of an olefin, especially propylene, based upon the use of sodium metal as the primary component of the catalyst system. Whereas in the past sodium was either totally ineffective or produced undesirable results, it now can be employed very effectively. Indeed, fast rates of dimerization are accomplished and high yields and conversions are obtained in short periods of time for producing the desired olefin. Still further, the heretofore undesirable effect of sodium drastically isomerizing the olefin products by shifting the double bond is essentially obviated. These and other advantages will be evident as the discussion proceeds.

The sodium metal can be in any form as, for example, lumps, bars, ribbon, or the like since, in most instances, it becomes molten under the reaction conditions.

The carbonate employed as an essential constituent of the catalyst system is a carbonate of an alkali metal having an atomic number of 19 to 55, inclusive, or of the metal barium. Thus, the carbonates include potassium, ribidium, cesium, or barium carbonate. It has been found that these carbonates in conjunction with the sodium metal produce profound effects in the dimerization reactions. The carbonates are employed in their readily available commercial forms, for example, as solids, pellets, and the like. In order to effect better distribution and admixture of the carbonate with the alkali metal, reduction in particle size is generally desirable. Thus, the carbonate is preferably employed in a form in which it has an average particle size of 100 microns or less with the largest particle size being less than 500 microns in major dimension. Pulverized carbonate or carbonate in powdered form is particularly effective. Of the carbonates, potassium carbonate comprises an especially preferred embodiment. It in conjunction with sodium metal has been found to be even more effective than the other sodium-alkali metal carbonate combinations.

In general, any olefin can be dimerized according to the processing of the instant invention, especially those having from 3 to about 8 carbon atoms. It is preferable that the olefin be a straight chain olefin, especially the alpha-olefins, since such are more readily dimerized to desirable products. Thus, among the olefins which are employed are included propylene, butene-1, butene-2, isobutylene, hexene-1, and octene-1. Propylene comprises an especially preferred embodiment because of its ready availability and the unique benefits obtained when employing such with the catalysts of this invention toward the production of 4-methylpentene-1.

The operational techniques are quite simple and varied. One technique which can be employed is to form a high surface film of the sodium on the carbonate. High surface sodium techniques are well known and briefly involve the mixing of the sodium with the carbonate, heating to above the melting point of sodium, and slightly agitating so that a thin film of sodium is deposited on the carbonate particles. The high surface sodium is then employed as the catalyst in a suitable reactor wherein the olefin is pressurized in contact with the catalyst. Another technique that is quite suitable is to merely add the sodium metal and the alkali metal carbonate to a reactor, supported or unsupported, and pressurize the reactor with the olefin, e.g. propylene. If desired, a solvent or reaction diluent can then be added to the system. The system is then heated to the desired reaction temperature, usually agitated, and maintained at these conditions until the reaction is essentially complete as indicated by the pressure drop. The reactor can then be vented to recover the olefin products and recycle any unreacted olefin, if such be the case. Then, the reactor need only be pressurized with the starting olefin and the cycle repeated numerous times without changing the catalyst. Alternatively, rather than employ the aforementioned batch or semicontinuous procedure, continuous procedures can be employed whereby the pressure is maintained by the continuous feeding of the starting olefin to the reactor with continuous withdrawal of the dimerized product therefrom for subsequent separation of the product and recycle of unreacted starting olefin. Other variations of batch, semicontinuous, or continuous operation will now be evident.

The present invention will be more readily understood from the following examples.

EXAMPLE I

To a reactor equipped with internal agitation, external heating means, and a means for heating and discharging the reactants and products was added 3.7 grams of sodium metal and 180 grams of potassium carbonate. The reactor was heated to about 100°C and mildly agitated to distribute the molten sodium on the potassium carbonate. Agitation was continued and the reactor heated to designated temperatures, then pressurized with propylene to 1000 psig. When the pressure in the reactor had dropped to about 500 psig, the reactor was vented and the product olefins analyzed. Then the reactor was repressurized with propylene without the addition of further catalyst to repeat the cycle. Employing this technique, the following table illustrates the results obtained upon recharging with propylene at the end of each cycle.

TABLE I

| Temp. °C | Residence Time (Hrs) | Moles Propylene Fed | Moles $C_6$ Product | Moles $C_6$ Produced per Hr/ Liter of Reactor | Composition of $C_6$ Product (Wt Percent) | | | | |
| --- | --- | --- | --- | --- | --- | --- | --- | --- | --- |
| | | | | | $M_4P_1$ | $M_4P_2$ | $M_2P_1 + H_1$ | $M_2P_2 + Tr-H_2$ | Cis $H_2$ |
| 130–140 | 2.0 | 1.23 | 0.083 | 0.17 | 75.9 | 11.4 | 7.0 | 4.4 | 1.1 |
| 140–200 | 1.4 | 1.01 | 0.157 | 0.45 | 33.0 | 40.2 | 4.8 | 18.8 | 2.0 |
| 140–190 | 2.0 | 1.01 | 0.204 | 0.41 | 47.2 | 37.7 | 2.7 | 9.5 | 1.8 |

$M_4P_1$ = 4-methylpentene-1
$M_4P_2$ = 4-methylpentene-2
$M_2P_1$ = 2-methylpentene-1
$H_1$ = Hexene-1
$M_2P_2$ = 2-methylpentene-2
Tr-$H_2$ = trans-hexene-2
cis-$H_2$ = cis-hexene-2

EXAMPLE II

Employing the procedure essentially as described in Example I, 1.44 grams of sodium were dispersed on 450 grams of potassium carbonate, 145 grams of propylene were employed, and the reaction temperature was maintained at 193° to 226°C for 40 min. whereby the pressure dropped from an initial 780 psig to a final pressure of 550 psig during this period. In this manner, 67 grams of hexenes were obtained which on analysis showed 47.22 percent 4-methylpentene-1, 33.72 percent 4-methylpentene-2, 2.31 percent 2-methylpentene-1, 8.72 percent 2-methylpentene-2 and 7.01 percent hexene-2.

EXAMPLE III

Employing the procedure of Example II with exception that an equal amount by weight of barium carbonate was substituted for the potassium carbonate, 160 grams of propylene were employed, the temperature was slowly raised to 250°C for a reaction period of 5.5 hours, and an initial pressure of 975 psig, a good conversion to hexenes was obtained.

The above examples illustrate the highly unique aspects of the instant invention wherein effective dimerization, especially of propylene to 4-methylpentene-1, is obtained by the catalyst system based upon sodium metal. In contrast to the results obtained therein, when sodium is employed alone, or sodium in conjunction with sodium carbonate under similar conditions of reaction with propylene, essentially no hexene product is produced.

EXAMPLE IV

When the procedure of Example I is repeated with exception that in place of propylene, butene-1 is employed as the olefin and in place of potassium carbonate, an equal amount by weight of rubidium or cesium carbonate is substituted. A mixture of octenes, the major portion of which consists of 5-methyl-2-heptene and 3,4-dimethyl-1-hexene is obtained in good yield.

EXAMPLE V

To a reactor equipped with internal agitation, external heating means, and a means of heating and discharging the reactants and products is added 5 grams of sodium metal and 1 gram of powdered potassium carbonate. Then, 100 ml of Nujol, a high boiling aliphatic hydrocarbon mixture of the mineral oil boiling range, is added to the reactor and heat applied to raise the temperature to about 135°C. Agitation is commenced and the reactor pressurized with 1.23 moles of propylene and heated to 179°C. and a pressure of 900 psig. When the pressure drops to about 400 psig, the reactor is vented and the product olefins recovered. In this manner, a high conversion of propylene to $C_6$ olefins is obtained in which the major component comprises 4-methylpentene-1.

EXAMPLE VI

When Example V is repeated with exception that an equal amount by weight of powdered barium carbonate is substituted for the potassium carbonate, equally good results are obtained.

The above examples have been presented by way of illustration and it is not intended to be limited thereto. It will now be evident that sodium in combination with any of the herein designated metal carbonates can be successfully used in our process. Likewise other olefins can be successfully used.

As indicated in the above discussion, the process can be conducted under a variety of conditions. Generally, the temperature which is employed is between about 100° and 250°C. Lower temperatures are employable, however, the rate and conversion are correspondingly reduced. Higher temperatures are to be avoided since some product degradation will occur, catalyst life is shortened, and isomerization results. It has been found that the best results with regard to rate of reaction, yield, minimization of isomerization, and the like are obtained at temperatures between about 150° to 200°C and therefore this range is especially preferred. Likewise, the pressure employed is variable and in general pressures of the order of atmospheric or super-atmospheric are employed. As the pressure is increased, the rate generally is further increased. For best operation, it has been found that pressures between about 300 to 1500 psi should be employed.

The proportion of the catalyst used to the amount of olefin employed can be varied. As indicated, by the above examples, many cycles of pressurization of the reactor with the olefin can be affected so that thus only a minor quantity of the catalyst is necessary. Ordinarily, between about 1 to 10 percent by weight of sodium based upon the total weight of sodium and starting olefin is employed with best results obtained at between 2 to 5 percent by weight of the catalyst. The proportion of the sodium in relation to the carbonate in those instances wherein a high surface sodium technique is employed can be varied over a considerable latitude as, for example, between about 0.5 to 5 percent by weight of sodium based on the total weight of the sodium and the carbonate catalyst mixture. For best results with regard to the film, between about 1 to 3 percent by weight of the sodium is employed. In those instances wherein simple mixtures (as, for example, Examples V and VI) of the sodium and the metal carbonate with or without solvent are used, the sodium concentration, in the sodium-carbonate catalyst system, is generally of the order of 1 to 50 percent by weight. As a practical matter, best results are obtained with regard to enhancement of reaction rate and production of the desired product when employing between 10 and 30 percent by weight of sodium based on the total weight of the catalyst mixture.

The starting materials which are employeed need not be subjected to any particular pre-treatment such as further purification, and the like. For example, the starting olefin, sodium metal, and metal carbonate are generally employed in their form as commercially available. The olefin can thus have other essentially inert constituents present therein, such as saturated hydrocarbons and the like. It is preferable that both the olefin and the metal carbonate be essentially anhydrous in order to avoid unnecessary reactivity with the sodium. However, the normal amount of moisture contained in commercial grades of the olefin and solid metal carbonates is not deleterious to the beneficial effects and results of the present invention.

As indicated by the above examples, generally the process is conducted in the presence of a solvent. While solvents are not required, they do facilitate heat control, contact of the reactants, and additionally provide a means for having the olefin in solution for greater reactivity. For these purposes, the usual essentially inert organic solvents can be employed. Among the criteria of choice of the solvents is that they be essentially inert and liquid under the reaction conditions employed. Likewise, it is desirable that they exhibit solubility for the olefin starting reagent. Thus, typical examples of solvents to be employed are the saturated aliphatic hydrocarbons, e.g. octane, nonane, decane, isooctane, decalin, cycloheptane, and mixtures as, for example, kerosene, mineral oil, and the like. It is preferable that the solvent employed be higher boiling, that is, that it have a boiling point at least 20°C higher than the boiling point of the olefin product. It is also preferred that the solvent have a boiling point or a boiling point range above about 200°C for ease of handling and separation from the reaction mixture. Mineral oil, such as Nujol or Bayol-D, comprises a particularly preferred solvent.

The olefin mixture produced according to the process of the instant invention can be employed for various uses as obtained directly from the reaction mixture, such as flashing from the reactor, continuous withdrawal, and the like. If it is desired to separate the mixture into its components to obtain more pure material, such can be accomplished by conventional techniques such as, for example, fractional distillation, azeotropic distillation, and extractive distillation. By such techniques, for example, from propylene dimerization, 4-methylpentene-1 can be obtained in greater purity for more effective use in polymerization and the other isomers having other uses, for example, 2-methyl-2-pentene can be isolated for cracking to isoprene by known techniques.

The products produced according to the process of the present invention are of considerable utility. By way of example, the longer chain olefins can be employed as solvents for various organic compounds. They can also be employed as components for fuel mixtures, especially fuels of the gasoline boiling range for internal combustion engines. For example, when adding 4-methylpentene-1 to a typical motor fuel, an enhancement in the octane number is obtained. Another use for the olefin products obtained is for polymerization to produce polymeric materials. A particularly effective illustration of this utility is the polymerization of 4-methylpentene-1 in the presence of a catalyst comprising an organometallic, such as triethylaluminum or diethyl aluminum chloride, in combination with a refractory metal halide, such as vanadium tetrachloride, at temperatures of about 100 to 200°C and elevated pressure to produce poly-4-methylpentene-1. This particular utility is illustrated in British Pat. Nos. 808,144 and 849,553. These polymers are quite useful in forming fibers as illustrated by U.S. Pat. No. 2,842,532, British Pat. No. 823,309, and British Pat. No. 835,759.

Other uses for the products produced according to the instant process will now be evident.

Having thus described the novel process of this invention, it is not intended that it be limited except as set forth in the following claims.

We claim:

1. A dimerization process which comprises heating an olefin feed consisting essentially of a straight chain alphamonoolefin having from 3 to about 8 carbon atoms with a catalyst consisting essentially of sodium as the alkali metal and a carbonate of a metal selected from the group consisting of alkali metals having an atomic number of 19 to 55, inclusive, and barium, the catalyst being prepared at about 100°C, the dimerization reaction being conducted at a temperature between about 100° and 250°C.

2. A process for the production of a catalyst suitable for polymerizing an olefinic hydrocarbon having at least 3 carbon atoms per molecule comprising dispersing elemental sodium on anhydrous potassium carbonate at a temperature of about 100°C.

* * * * *

UNITED STATES PATENT OFFICE
CERTIFICATE OF CORRECTION

PATENT NO. : 3,916,019
DATED : October 28, 1975
INVENTOR(S) : Rex D. Closson, et al It is certified that error appears in the above–identified patent and that said Letters Patent are hereby corrected as shown below:

Col. 4, line 23, reads "Cls", should read -- Cis --.

Signed and Sealed this

Twenty-second Day of March 1977

[SEAL]

Attest:

RUTH C. MASON
Attesting Officer

C. MARSHALL DANN
Commissioner of Patents and Trademarks